(12) United States Patent
Svendsen

(10) Patent No.: US 8,001,124 B2
(45) Date of Patent: *Aug. 16, 2011

(54) SYSTEM AND METHOD FOR TAGGING IMAGES BASED ON POSITIONAL INFORMATION

(75) Inventor: Hugh Svendsen, Chapel Hill, NC (US)

(73) Assignee: Qurio Holdings, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/911,323

(22) Filed: Oct. 25, 2010

(65) Prior Publication Data
US 2011/0040779 A1    Feb. 17, 2011

Related U.S. Application Data

(63) Continuation of application No. 11/282,556, filed on Nov. 18, 2005, now Pat. No. 7,822,746.

(51) Int. Cl.
G06F 17/30    (2006.01)

(52) U.S. Cl. ........ 707/736; 707/749; 707/758; 707/767; 707/770; 707/784

(58) Field of Classification Search ............. 707/999.01, 707/999.003, 999.104, 736, 748, 749, 751, 707/758, 767, 770, 784
See application file for complete search history.

(56) References Cited

U.S. PATENT DOCUMENTS

| | | | |
|---|---|---|---|
| 5,296,884 A | 3/1994 | Honda et al. | |
| 5,633,678 A | 5/1997 | Parulski et al. | |
| 5,768,640 A | 6/1998 | Takahashi et al. | |
| 5,812,768 A | 9/1998 | Page et al. | |
| 6,115,717 A | 9/2000 | Mehrotra et al. | |
| 6,181,878 B1 | 1/2001 | Honda | |
| 6,202,061 B1 | 3/2001 | Khosla et al. | |
| 6,222,985 B1 | 4/2001 | Miyake | |
| 6,247,009 B1 * | 6/2001 | Shiiyama et al. | 1/1 |
| 6,249,787 B1 | 6/2001 | Schleimer et al. | |
| 6,275,829 B1 | 8/2001 | Angiulo et al. | |
| 6,282,548 B1 | 8/2001 | Burner et al. | |
| 6,304,729 B2 | 10/2001 | Honda et al. | |
| 6,366,907 B1 | 4/2002 | Fanning et al. | |
| 6,396,537 B1 | 5/2002 | Squilla et al. | |
| 6,437,797 B1 | 8/2002 | Ota | |
| 6,462,778 B1 | 10/2002 | Abram et al. | |
| 6,469,698 B2 | 10/2002 | Fukahori | |
| 6,507,371 B1 | 1/2003 | Hashimoto et al. | |
| 6,583,799 B1 | 6/2003 | Manolis et al. | |
| 6,629,104 B1 | 9/2003 | Parulski et al. | |

(Continued)

OTHER PUBLICATIONS

U.S. Appl. No. 60/670,969, filed Apr. 2005, Limberis et al.*

(Continued)

Primary Examiner — Charles Rones
Assistant Examiner — Rezwanul Mahmood
(74) Attorney, Agent, or Firm — Withrow & Terranova, PLLC

(57) ABSTRACT

A system and method for suggesting keywords for tagging a digital image are provided. In general, a requesting node is communicatively coupled to a keyword service via a network. The requesting node sends a request to the keyword service requesting suggested keywords for a digital image. The request includes information relating to the digital image such as positional information. Based on the information, the keyword service generates a list of suggested keywords and provides the list of suggested keywords to the requesting node. At the requesting node, the list of suggested keywords is displayed to a user, and the user selects one or more of the suggested keywords for tagging the digital image.

8 Claims, 8 Drawing Sheets

U.S. PATENT DOCUMENTS

| | | | |
|---|---|---|---|
| 6,657,661 B1* | 12/2003 | Cazier | 348/231.2 |
| 6,757,684 B2* | 6/2004 | Svendsen et al. | 707/999.01 |
| 6,914,625 B1 | 7/2005 | Anderson et al. | |
| 6,914,626 B2* | 7/2005 | Squibbs | 348/231.3 |
| 6,943,825 B2* | 9/2005 | Silvester | 348/113 |
| 7,002,625 B2 | 2/2006 | Takahashi | |
| 7,028,253 B1* | 4/2006 | Lieberman et al. | 707/999.004 |
| 7,046,285 B2 | 5/2006 | Miyagi et al. | |
| 7,117,199 B2* | 10/2006 | Frank et al. | 707/999.003 |
| 7,409,411 B2* | 8/2008 | Sato | 707/999.104 |
| 7,502,795 B1* | 3/2009 | Svendsen et al. | 707/999.01 |
| 7,647,349 B2* | 1/2010 | Hubert et al. | 707/999.107 |
| 7,685,209 B1* | 3/2010 | Norton et al. | 707/803 |
| 7,739,304 B2* | 6/2010 | Naaman et al. | 707/784 |
| 7,747,574 B1* | 6/2010 | Svendsen | 707/821 |
| 7,882,112 B2* | 2/2011 | Takata et al. | 707/749 |
| 2002/0049792 A1* | 4/2002 | Wilcox et al. | 707/522 |
| 2002/0071677 A1 | 6/2002 | Sumanaweera | |
| 2002/0075329 A1 | 6/2002 | Prabhu et al. | |
| 2002/0095399 A1 | 7/2002 | Devine et al. | |
| 2002/0184310 A1 | 12/2002 | Traversat et al. | |
| 2002/0191087 A1 | 12/2002 | Hashimoto et al. | |
| 2003/0004916 A1 | 1/2003 | Lewis | |
| 2003/0018607 A1 | 1/2003 | Lennon et al. | |
| 2003/0063770 A1 | 4/2003 | Svendsen et al. | |
| 2003/0070070 A1 | 4/2003 | Yeager et al. | |
| 2003/0088544 A1 | 5/2003 | Kan et al. | |
| 2003/0156208 A1 | 8/2003 | Obradovich | |
| 2004/0021780 A1 | 2/2004 | Kogan | |
| 2004/0070678 A1 | 4/2004 | Toyama et al. | |
| 2004/0174434 A1* | 9/2004 | Walker et al. | 348/211.3 |
| 2004/0174443 A1 | 9/2004 | Simske | |
| 2005/0091232 A1* | 4/2005 | Eschbach et al. | 707/100 |
| 2005/0198068 A1* | 9/2005 | Mukherjee et al. | 707/104.1 |
| 2005/0278379 A1 | 12/2005 | Nakazawa | |
| 2006/0015193 A1 | 1/2006 | Kato | |
| 2006/0184566 A1* | 8/2006 | Lo et al. | 707/102 |
| 2006/0195325 A1 | 8/2006 | Tateson et al. | |
| 2006/0195461 A1* | 8/2006 | Lo et al. | 707/100 |
| 2006/0221190 A1* | 10/2006 | Limberis et al. | 348/207.1 |
| 2006/0259511 A1* | 11/2006 | Boerries et al. | 707/103 R |
| 2006/0271691 A1* | 11/2006 | Jacobs et al. | 709/228 |
| 2007/0064121 A1* | 3/2007 | Issa et al. | 348/231.2 |
| 2007/0078833 A1* | 4/2007 | Chea et al. | 707/3 |
| 2007/0078883 A1* | 4/2007 | Hayashi et al. | 707/102 |
| 2007/0097420 A1* | 5/2007 | Shah et al. | 358/1.15 |
| 2007/0118525 A1* | 5/2007 | Svendsen | 707/9 |
| 2007/0204218 A1* | 8/2007 | Weber et al. | 715/530 |
| 2008/0126388 A1* | 5/2008 | Naaman | 707/102 |
| 2008/0126961 A1* | 5/2008 | Naaman et al. | 707/3 |
| 2008/0162568 A1* | 7/2008 | Shen | 707/104.1 |
| 2008/0168055 A1* | 7/2008 | Rinearson et al. | 707/5 |
| 2008/0195657 A1* | 8/2008 | Naaman et al. | 707/104.1 |
| 2009/0049408 A1* | 2/2009 | Naaman et al. | 715/835 |
| 2009/0083116 A1* | 3/2009 | Svendsen | 705/10 |
| 2009/0083117 A1* | 3/2009 | Svendsen et al. | 707/4 |
| 2009/0089322 A1* | 4/2009 | Naaman | 707/103 R |
| 2009/0125560 A1* | 5/2009 | Munekuni et al. | 707/104.1 |
| 2009/0177627 A1* | 7/2009 | Yoon et al. | 707/3 |
| 2009/0222432 A1* | 9/2009 | Ratnakar | 707/5 |
| 2009/0222488 A1* | 9/2009 | Boerries et al. | 707/104.1 |
| 2009/0228510 A1* | 9/2009 | Slaney et al. | 707/102 |
| 2009/0259647 A1* | 10/2009 | Curtis | 707/5 |
| 2010/0063961 A1* | 3/2010 | Guiheneuf et al. | 707/622 |
| 2010/0095194 A1* | 4/2010 | Austin et al. | 707/999.103 |
| 2010/0125568 A1* | 5/2010 | van Zwol et al. | 707/722 |
| 2010/0131567 A1* | 5/2010 | Dorogusker et al. | 707/802 |
| 2010/0161631 A1* | 6/2010 | Yu et al. | 707/758 |
| 2010/0185642 A1* | 7/2010 | Higgins et al. | 707/758 |
| 2010/0198824 A1* | 8/2010 | Tsubaki | 707/736 |
| 2010/0198940 A1* | 8/2010 | Anderson et al. | 707/758 |
| 2010/0250136 A1* | 9/2010 | Chen | 701/300 |
| 2010/0274774 A1* | 10/2010 | Son et al. | 707/706 |
| 2011/0029873 A1* | 2/2011 | Eseanu et al. | 715/719 |
| 2011/0030031 A1* | 2/2011 | Lussier et al. | 726/1 |
| 2011/0034176 A1* | 2/2011 | Lord et al. | 455/450 |
| 2011/0040754 A1* | 2/2011 | Peto et al. | 707/736 |
| 2011/0047517 A1* | 2/2011 | Lee et al. | 715/863 |
| 2011/0072015 A1* | 3/2011 | Lin et al. | 707/737 |

OTHER PUBLICATIONS

Limberis et. al., "Notification system for capturing new or unknown metadata for Personal Image/Video Meta Data Capture system and Alerts", Apr. 1, 2005, U.S. Appl. No. 60/670,969, pp. 1-7.*

Ancona et. al., "Mobile Vision and Cultural Heritage: the AGAMEMNON Project", Nov 25, 2000, pp. 1-15.*

Rattenbury et. al. "Towards Automatic Extraction of Event and Place Semantics from Flickr Tags", Jan. 1, 2004, pp. 1-10.*

Office Action having a mailing date of Apr. 18, 2006, issued by the Patent Office during prosecution of U.S. Appl. No. 11/282,556.

Final Office Action having a mailing date of Oct. 19, 2006, issued by the Patent Office during prosecution of U.S. Appl. No. 11/282,556.

Advisory Action having a mailing date of Jan. 8, 2007, issued by the Patent Office during prosecution of U.S. Appl. No. 11/282,556.

Office Action having a mailing date of Feb. 5, 2007, issued by the Patent Office during prosecution of U.S. Appl. No. 11/282,556.

Office Action having a mailing date of Jul. 30, 2007, issued by the Patent Office during prosecution of U.S. Appl. No. 11/282,556.

Final Office Action having a mailing date of Jan. 11, 2008, issued by the Patent Office during prosecution U.S. Appl. No. 11/282,556.

Office Action having a mailing date of Mar. 31, 2008, issued by the Patent Office during prosecution of U.S. Appl. No. 11/282,556.

Final Office Action having a mailing date of Oct. 22, 2008, issued by the Patent Office during prosecution of U.S. Appl. No. 11/282,556.

Advisory Action having a mailing date of Jan. 7, 2009, issued by the Patent Office during prosecution of U.S. Appl. No. 11/282,556.

Office Action having a mailing date of Apr. 28, 2009, issued by the Patent Office during prosecution of U.S. Appl. No. 11/282,556.

Final Office Action having a mailing date of Jan. 7, 2010, issued by the Patent Office during prosecution of U.S. Appl. No. 11/282,556.

Advisory Action having a mailing date of Mar. 16, 2010, issued by the Patent Office during prosecution of U.S. Appl. No. 11/282,556.

Notice of Allowance having a mailing date of Aug. 18, 2010, issued by the Patent Office during prosecution of U.S. Appl. No. 11/282,556.

Ancona, M., et al., "Mobile Vision and Cultural Heritage: the AGAMEMNON Project," Department of Information Science, University of Genova, May 2006, pp. 1-15.

Rattenbury, T., et al., "Towards Automatic Extraction of Event and Place Semantics from Flickr Tags," Yahoo! Research Berkeley, Jul. 2007, pp. 1-8.

* cited by examiner

SYSTEM AND METHOD FOR TAGGING IMAGES BASED ON POSITIONAL INFORMATION

CROSS-REFERENCE TO RELATED APPLICATION

The present application is a continuation of U.S. patent application Ser. No. 11/282,556, filed on Nov. 18, 2005, the disclosure of which is hereby incorporated by reference in its entirety

RELATED U.S. PATENT APPLICATION

This U.S. patent application is also related to U.S. patent application Ser. No. 11/282,557, filed on Nov. 18, 2005, entitled COLLABORATIVE SERVICE FOR SUGGESTING MEDIA KEYWORDS BASED ON LOCATION DATA, by Hugh Svendsen, which is hereby incorporated herein by reference in its entirety.

FIELD OF THE INVENTION

The present invention relates to tagging digital images with one or more keywords, and more specifically relates to suggesting keywords for tagging the digital images.

BACKGROUND OF THE INVENTION

Given the recent advances in digital camera technology, users may accumulate digital image collections having hundreds of digital images. As a result, it is becoming increasingly difficult for users to organize their digital image collections such that they can easily and quickly find desired images. One method for assisting a user in finding digital images within his collection is tagging the digital images with keywords such as "Christmas 2004," "Italy," "Vacation," and the like. However, the typical the tagging process is manually intensive. In general, tagging typically occurs after the user has uploaded numerous digital images from his digital camera to his personal computer. Each digital image may then be tagged with one or more keywords by either manually entering the keywords or selecting the keywords from a static list of keywords previously created by the user.

One problem associated with the typical tagging process is that the process becomes prohibitively time consuming for the average user if the user must manually enter the desired keywords. Further, even in the systems that allow the user to select the desired keywords from a static list of keywords, the user may be forced to sort through many keywords that are not particularly relevant to find the desired keywords. In addition, the static list may not contain many relevant keywords. Thus, there remains a need for a system that automates much of the tagging process and that intelligently suggests keywords to the user.

SUMMARY OF THE INVENTION

The present invention relates to a system and method for suggesting keywords for tagging a digital media such as a digital image. In general, a requesting node is communicatively coupled to a keyword service via a network. The requesting node sends a request to the keyword service requesting suggested keywords for a digital image. The request includes information relating to the digital image such as positional information. Based on the information, the keyword service generates a list of suggested keywords and provides the list of suggested keywords to the requesting node. At the requesting node, the list of suggested keywords is displayed to a user, and the user selects one or more of the suggested keywords for tagging the digital image.

In one embodiment, the requesting node is a digital camera equipped with a system for providing positional information defining a location of the digital camera and a wireless communication interface coupling the digital camera to the network. The system for providing the positional information may be a Satellite Positioning System (SPS) receiver. Either prior to capturing the digital image or after capturing the digital image, the digital camera sends the request including the positional information to the keyword service. If the request is sent prior to capturing the digital image, the positional information defines the location of the digital camera at the time of sending the request. If the request is sent after the digital image is captured, the positional information defines the location of the digital camera at the time of capturing the digital image. In response to the request, the keyword service generates the list of suggested keywords based on the positional information and provides the list of suggested keywords to the digital camera.

In another embodiment, the requesting node is a personal computer, Personal Digital Assistant (PDA), or the like, wherein the digital image and positional information defining the location of the digital camera at the time of capturing the digital image are transferred from the digital camera to the personal computer. Thereafter, the personal computer sends the request including the positional information to the keyword service. In response, the keyword service generates the list of suggested keywords based on the positional information and provides the list of suggested keywords to the requesting node.

In one embodiment, the keyword service generates the list of suggested keywords based, at least in part, on a search of a number of digital images associated with numerous owners to find digital images captured at the location or proximate to the location defined by the positional information. Keywords used to tag the digital images found during the search are identified and may be included within the list of suggested keywords.

In another embodiment, the keyword service generates the list of suggested keywords based, at least in part, on a search of a number of digital images associated with the user of the digital camera to find digital images captured at the location or proximate to the location defined by the positional information. Keywords used to tag the digital images found during the search are identified and may be included within the list of suggested keywords.

In yet another embodiment, the keyword service generates the list of suggested keywords based on, at least in part, requesting keywords for the location defined by the positional information from a location keyword registry service. Prior to receiving the request, the location keyword registry service interacts with a number of users using a collaborative process to determine one or more keywords for numerous locations. The location keyword registry service may also enable a user to define preferred keywords for one or more locations of interest to a user. In response to the request from the keyword service, the keyword location registry service may provide one or more popular keywords for the location, one or more preferred keywords of the user of the location, and optionally one or more keywords selected for the location at random.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for suggesting keywords for tagging digital images based on positional information. While the description herein focuses on digital images, the present invention is equally applicable to suggesting keywords for tagging digital media such as, but not limited to, digital images, digital videos, and the like. As used herein, a digital media refers to a digital image, a digital video, or the like while "a plurality of digital media," "a number of digital media," or the like refers to multiple digital images, digital videos, or the like.

According to one embodiment of the present invention, a digital camera may be equipped with a Satellite Positioning System (SPS) receiver and a wireless communication interface. The wireless communication interface may be a transceiver that supports cellular or local wireless communications. Either before or after capturing a digital image, a user of the digital camera requests suggested keywords for the digital image. In response, the digital camera sends a request including the location of the digital camera to a keyword service. Based on the location of the digital camera, the keyword service returns a list of suggested keywords to the digital camera. Thereafter, the user of the digital camera selects one or more of the suggested keywords for tagging the digital image.

Figure 1:
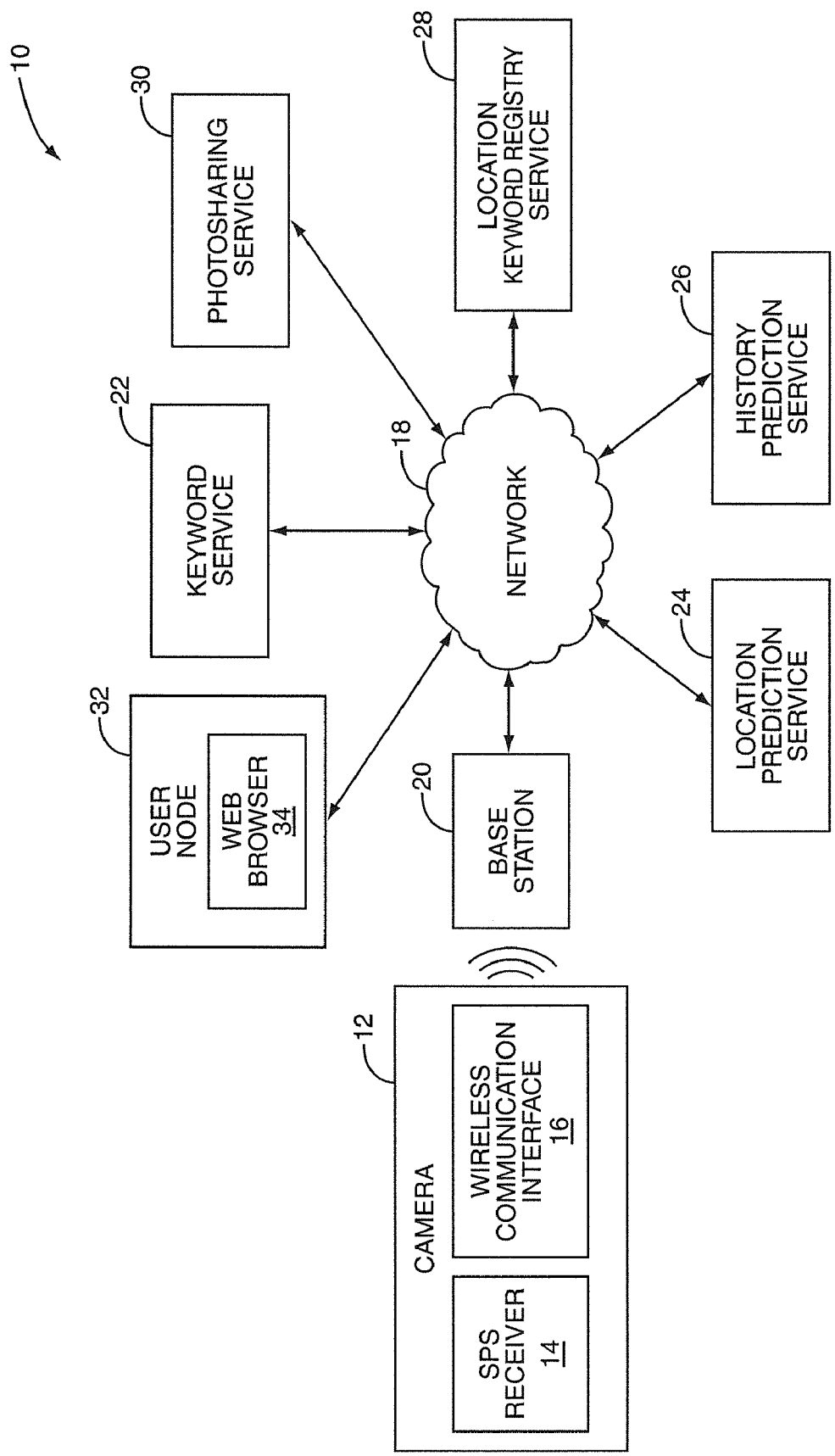
FIG. 1 illustrates a system for suggesting keywords for tagging a digital image according to one embodiment of the present invention.

FIG. 1 is a block diagram of a system 10 for tagging digital images with one or more suggested keywords according to one embodiment of the present invention. The system 10 includes a digital camera 12 equipped with an SPS receiver 14 and a wireless communication interface 16. The SPS receiver 14 may be a Global Positioning System (GPS) receiver. However, it should be noted that the digital camera 12 may alternatively obtain positional information from an external source such as a base station in a cellular network. In one embodiment, the wireless communication interface 16 may include a transceiver that supports cellular communications. Thus, for example, the digital camera 12 may be a camera phone equipped with a GPS receiver. In an alternative embodiment, the wireless communication interface 16 may include a transceiver that supports local wireless communications such as, but not limited to, the Wireless-Fidelity (Wi-Fi) standard, one or more of the IEEE 802.11 standards, the Bluetooth standard, or the like.

Using the wireless communication interface 16, the digital camera 12 is coupled to a network 18 via an access point 20. Preferably, the network 18 is the Internet. The access point 20 may be a base station in cellular network. Note that there may be additional cellular network infrastructure coupling the access point 20 to the network 18, as will be apparent to one of ordinary skill in the art. Alternatively, the access point 20 may be an access point for a local wireless communication network.

The system 10 also includes a keyword service 22, a location prediction service 24, a history prediction service 26, a location keyword registry service 28, a photosharing service 30, and a user node 32. The keyword service 22 operates to provide suggested keywords in response to a request from the digital camera 12. The request from the digital camera 12 may be sent before capturing a digital image and includes positional information from the SPS receiver 14 defining the location of the digital camera 12 at the time of sending the request. The positional information may define the location of the digital camera 12 in terms of latitude and longitude. Alternatively, the request from the digital camera 12 may be sent after capturing a digital image and includes positional information from the SPS receiver 14 defining the location of the digital camera 12 at the time the digital image is captured. Note that the positional information may be stored in association with the digital image at the time of capturing the digital image. For example, the positional information may be stored as metadata in a digital image file corresponding to the digital image.

As described below in more detail, upon receiving the request from the digital camera 12, the keyword service 22 communicates with one or more of the location prediction service 24, the history prediction service 26, and the location keyword registry service 28 to obtain keywords based on the positional information. The keyword service 22 then combines the keywords from the services 24-28 to provide the suggested keywords to the digital camera 12. It should be noted that while the discussion herein focuses on the use of all of the services 24-28, the present invention is not limited thereto. Any combination of one or more of the services 24-28 may be used. In addition, rather than sending the request for suggested keywords to the keyword service 22, the request may be sent directly to one or more of the services 24-28.

The location prediction service 24 operates to obtain keywords previously used by users associated with the photosharing service 30 to tag digital images captured at the location or proximate to the location defined by the positional information from the digital camera 12. As described below, the location prediction service 24 may request that the photosharing service 30 search the digital images hosted by the photosharing service 30 for digital images captured at or proximate to the location defined by the positional information. In response, the photosharing service 30 searches for digital images captured at the location or proximate to the location defined by the positional information and returns statistics to the location prediction service 24. The statistics may include the keywords used to tag the digital images found during the search and the number of occurrences of times each of the keywords. The location prediction service 24 may then select a number of most popular keywords from the statistics from the photosharing service 30 and return the most popular keywords to the keyword service. The number of most popular keywords returned by the location prediction service 24 may be predetermined by the user of the digital camera 12, determined based on a priority assigned to the location prediction service 24 by the user, or determined based on feedback of ones of the suggested keywords selected by the user to tag the digital images. The number of most popular keywords returned may additionally or alternatively be based on a maximum number of keywords to be suggested to the digital camera 12.

The history prediction service 26 operates to obtain keywords previously used by the user of the digital camera 12 to tag digital images captured at the location or proximate to the location defined by the positional information from the digital camera 12. Note that the history prediction service 26 obtains keywords based on a search of the user's previously captured digital image, whereas the location prediction service 24 obtains keywords based on digital images hosted by the photosharing service 30 for a number of users of the photosharing service 30.

Based on the positional information and optionally a username, date, or time, the history prediction service 26 may communicate with the photosharing service 30 to obtain keywords previously used by the user to tag digital images captured at the location or proximate to the location defined by the positional information. In one embodiment, the photosharing service 30 searches the digital images hosted by the photosharing service 30 that are associated with the user of the digital camera 12 to find digital images previously captured by the user at the location or proximate to the location defined by the positional information. The photosharing service 30 then returns statistics to the history prediction service 26. The statistics may include the keywords previously used by the user to tag the digital images found during the search and the number of occurrences of times each of the keywords. The history prediction service 26 may then select a number of most popular keywords from the statistics from the photosharing service 30 and returns the most popular keywords to the keyword service. The number of most popular keywords returned by the history prediction service 26 may be predetermined by the user of the digital camera 12, determined based on a priority assigned to the history prediction service 26 by the user, or determined based on feedback of ones of the suggested keywords selected by the user to tag the digital images. The number of most popular keywords returned may additionally or alternatively be based on a maximum number of keywords to be suggested to the digital camera 12.

As described below in more detail, the location keyword registry service 28 operates to provide keywords for the location defined by the positional information from the digital camera 12 based on a collaborative process. More specifically, the location keyword registry service 28 preferably includes a webpage or website operating as a user interface of the location keyword registry service 28. Users associated with user nodes such as the user node 32 interact with the location keyword registry service 28 via a web browser 34 in order to nominate keywords for locations, vote on the keywords to define the most popular keywords for the locations, set user preferences, and optionally contest keywords previously nominated for the locations.

Thereafter, when the location keyword registry service 28 receives a request for keywords for a particular location, the location keyword registry service 28 may return the most popular keywords for the location and, if defined, preferred keywords for the location previously defined by the user. The location keyword registry service 28 may also return one or more less popular keywords for the location selected at random. The number of keywords returned may be defined by the user of the digital camera 12, determined by the keyword service 22 based on a priority assigned to the location keyword registry service 28 by the user, or determined based on feedback of ones of the suggested keywords selected by the user to tag the digital images. Note that the feedback of selected keywords may be used by the keyword service 22 to determine which of the services 24-28 are most popular with the user. The number of keywords returned may additionally or alternatively be based on a maximum number of keywords to be suggested to the digital camera 12.

The photosharing service 30 is part of a photosharing system such as a centrally hosted photosharing system or a peer-to-peer (P2P) photosharing system. In a centrally hosted photosharing system, the digital images for any number of users are hosted by a central server. The photosharing service 30 may be implemented on the central server. In a P2P photosharing system, the digital images are hosted by peer nodes, where the peer nodes may be a computer or the like associated with a user. The peer nodes may be communicatively coupled through a proxy as described in U.S. patent application Ser. No. 10/813,839, entitled METHOD AND SYSTEM FOR PROVIDING WEB BROWSING THROUGH A FIREWALL IN A PEER TO PEER NETWORK, filed on Mar. 31, 2004, currently pending, which is hereby incorporated by reference in its entirety. In the P2P photosharing system, the photosharing service 30 may be implemented on a central node along with the proxy such that the photosharing service 30 is communicatively coupled to each of the peer nodes in the P2P photosharing system.

While only one photosharing service 30 is illustrated in FIG. 1, the present invention is not limited thereto. There may be any number of photosharing services 30. If there are more than one photosharing services 30, the user of the digital camera 12 may be required to register with the keyword service 22 and to define the ones of the photosharing services 30 with which the user is registered. This may be done by providing a username for the user for each of the photosharing services 30. When the keyword service 22 thereafter receives a request to suggest keywords to the user of the digital camera 12, the keyword service 22 may provide the usernames and identifiers of the corresponding ones of the photosharing services 30 to the services 24 and 26 as needed.

Although the keyword service 22, the location prediction service 24, the history prediction service 26, the location keyword registry service 28, and the photosharing service 30 are illustrated in FIG. 1 as being separate entities, they may be physically implemented on one or more servers coupled to the network 18. All of the services 22-30 may be implemented on a single server or implemented on a number of servers. Numerous variations in the physical implementation of the present invention will be apparent to one of ordinary skill in the art and are within the scope of the present invention.

Figure 2:
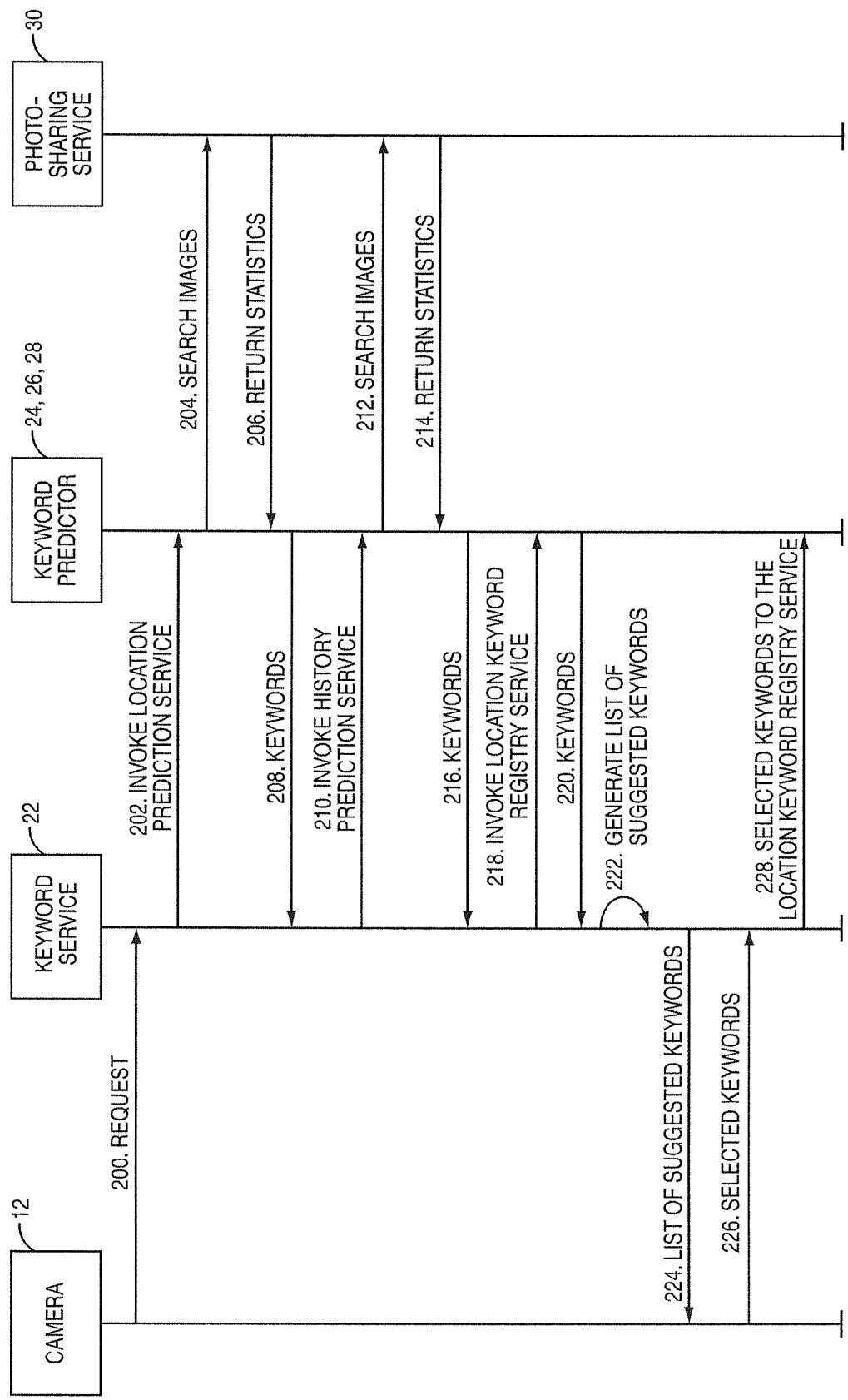
FIG. 2 illustrates the operation of the system of FIG. 1 to suggest keywords according to one embodiment of the present invention.

FIG. 2 illustrates the operation of the system 10 of FIG. 1 according to one embodiment of the present invention. While FIG. 2 illustrates a process for suggesting keywords using each of the location prediction service 24, the history prediction service 26, and the location keyword registry service 28, using all of the services 24-28 is not necessary to the present invention. The present invention may be implemented with any combination of one or more of the location prediction service 24, the history prediction service 26, and the location keyword registry service 28. Further, if only one of the services 24-28 is used, the functionality of the keyword service 22 may be combined with the functionality of the one of the services 24-28, thereby resulting in a single service which may be implemented on a server.

First, the digital camera 12 sends a request to the keyword service 22 (step 200). The request includes positional information and optionally one or more of a username, date, and time. As examples, the request may be an Extensible Markup Language (XML) request or a Uniform Resource Locator (URL) including a query. The request may be sent before the user of the digital camera 12 captures a digital image, and the positional information defines the location of the digital camera 12 at the time of sending the request. If the request includes the date and time, they are the date and time of sending the request. Alternatively, the request may be sent at some point in time after capturing a digital image. More specifically, the request may be sent immediately after capturing the digital image or some time after capturing the digital image when the digital camera 12 establishes a connection with the network 18. The positional information defining the location of the digital camera 12 and optionally the date and time may be obtained from the SPS receiver 14 at the time of capturing the digital image and stored by the digital camera 12 in association with the digital image. For example, the positional information, the date, and the time may be stored in metadata associated with the digital image. More specifically, image file formats such as the Joint Photographic Experts Group (JPEG) format enable the storage of the positional information, the date, and the time within the image file for the digital image as metadata. Generally, metadata is any information describing the digital image and may include information about the digital camera 12 and its settings. Alternatively, the positional information, the date, and the time may be stored in the memory of the digital camera 12 in association with the digital image.

As stated above, the request may also include a username. The username may be entered by the user of the digital camera 12 or stored in the digital camera 12. Alternatively, the username may be some indicia identifying the digital camera 12 which may be associated with the user of the digital camera 12 at the keyword server 22. For example, if the digital camera 12 is a camera phone, the username may be a telephone number of the camera phone.

Upon receiving the request, the keyword server 22 may invoke the location prediction service 24 (step 202). Invoking the location prediction service 24 is preferably performed by sending a request including the positional information received from the digital camera 12 to the location prediction service 24. In response, the location prediction service 24 sends a request to the photosharing service 30 instructing the photosharing service 30 to search the digital images hosted by the photosharing service 30 for digital images captured at the location or proximate to the location defined by the positional information from the digital camera 12 (step 204). The photosharing service 30 then performs the search and returns statistics including the keywords used to tag the digital images found during the search and the number of occurrences of each of the keywords (step 206).

The location prediction service 24 then returns one or more of the keywords in the statistics to the keyword service 22 (step 208). In one embodiment, the location prediction service 24 selects a number of most popular keywords from the statistics from the photosharing service 30 and returns the most popular keywords to the keyword service 22. The number of keywords returned by the location prediction service 24 may be predefined by the user of the digital camera 12 or controlled based on a priority assigned to the location prediction service 24 by the user of the digital camera 12. Additionally or alternatively, the number of keywords returned by the location prediction service 24 may be controlled based on a maximum number of keywords to be suggested to the user at the digital camera 12.

The keyword service 22 may then invoke the history prediction service 26 (step 210). The history prediction service 26 operates similarly to the location prediction service 24. However, the history prediction service 26 searches only the previous digital images of the user of the digital camera 12, whereas the location prediction service 26 searches the digital images 12 captured by a number of users of the photosharing service 30.

The history prediction service 26 is preferably invoked by sending a request to the history prediction service 26 including the positional information and a username of the user of the digital camera 12. In response, the history prediction service 26 sends a request to the photosharing service 30 instructing the photosharing service 30 to search the digital images associated with the user of the digital camera 12 that are hosted by the photosharing service 30 to find digital images captured at the location or proximate to the location defined by the positional information from the digital camera 12 (step 212). The photosharing service 30 then performs the search and returns statistics including the keywords previously used by the user to tag the digital images found during the search and the number of occurrences each of the keywords was used (step 214).

The history prediction service 26 then returns one or more keywords from the statistics to the keyword service 22 (step 216). In one embodiment, the history prediction service 26 selects a number of most popular keywords from the statistics from the photosharing service 30 and returns the most popular keywords to the keyword service 22. The number of keywords returned by the history prediction service 26 may be predefined by the user of the digital camera 12 or controlled based on a priority assigned to the history prediction service 26 by the user of the digital camera 12. Additionally or alternatively, the number of keywords returned by the history prediction service 26 may be controlled based on a maximum number of keywords to be suggested to the user at the digital camera 12.

The keyword service 22 may also invoke the location keyword registry service 28 (step 218). The location keyword registry service 28 may be invoked by sending a request including the positional information and optionally a username, date, and time to the location keyword registry service 28. Based on the positional information and optionally username, date, and time, the location keyword registry service 28 returns keywords to the keyword service 22 (step 220). The date and time may be beneficial where the relevant keywords for a particular location vary depending on the date and time. For example, the Mile High Stadium in Denver, Colo., may host numerous sporting events. The teams playing in the sporting events may vary depending on the date and time. As such, the location keyword registry service 28 may suggest different keywords depending on the date and time to reflect the different events held at the stadium.

The location keyword registry service 28 determines the most popular keywords for the location or for locations proximate to the location defined by the positional information. The location keyword registry service 28 may optionally select one or more less popular keywords for the location at random. By selecting one or more keywords at random, the location keyword registry service 28 gives credence to less popular keywords that may be relevant but are less popular because they are newly nominated. In addition, the location keyword registry service 28 determines whether the user of the digital camera 12 has previously interacted with the location keyword registry service 28 to define preferred keywords for the location or for locations proximate to the location defined by the positional information, as described below. The most popular keywords, and optionally the user's preferred keywords and one or more keywords selected at random, are returned to the keyword service 22 (step 220).

The keyword service 22 then generates a list of suggested keywords by combining the keywords returned in steps 208, 216, and 220 (step 222). Thereafter, the list of suggested keywords is provided to the digital camera 12 (step 224). The user of the digital camera 12 may then select one or more keyword from the list of suggested keywords for the digital image, thereby tagging the digital image with the selected keywords. Optionally, the digital camera 12 may provide the selected keywords and optionally the positional information to the location keyword registry service 28 (steps 226 and 228). The location keyword registry service 28 may use the selected keywords in determining the popularity of the keywords for the location defined by the positional information.

Figure 3:
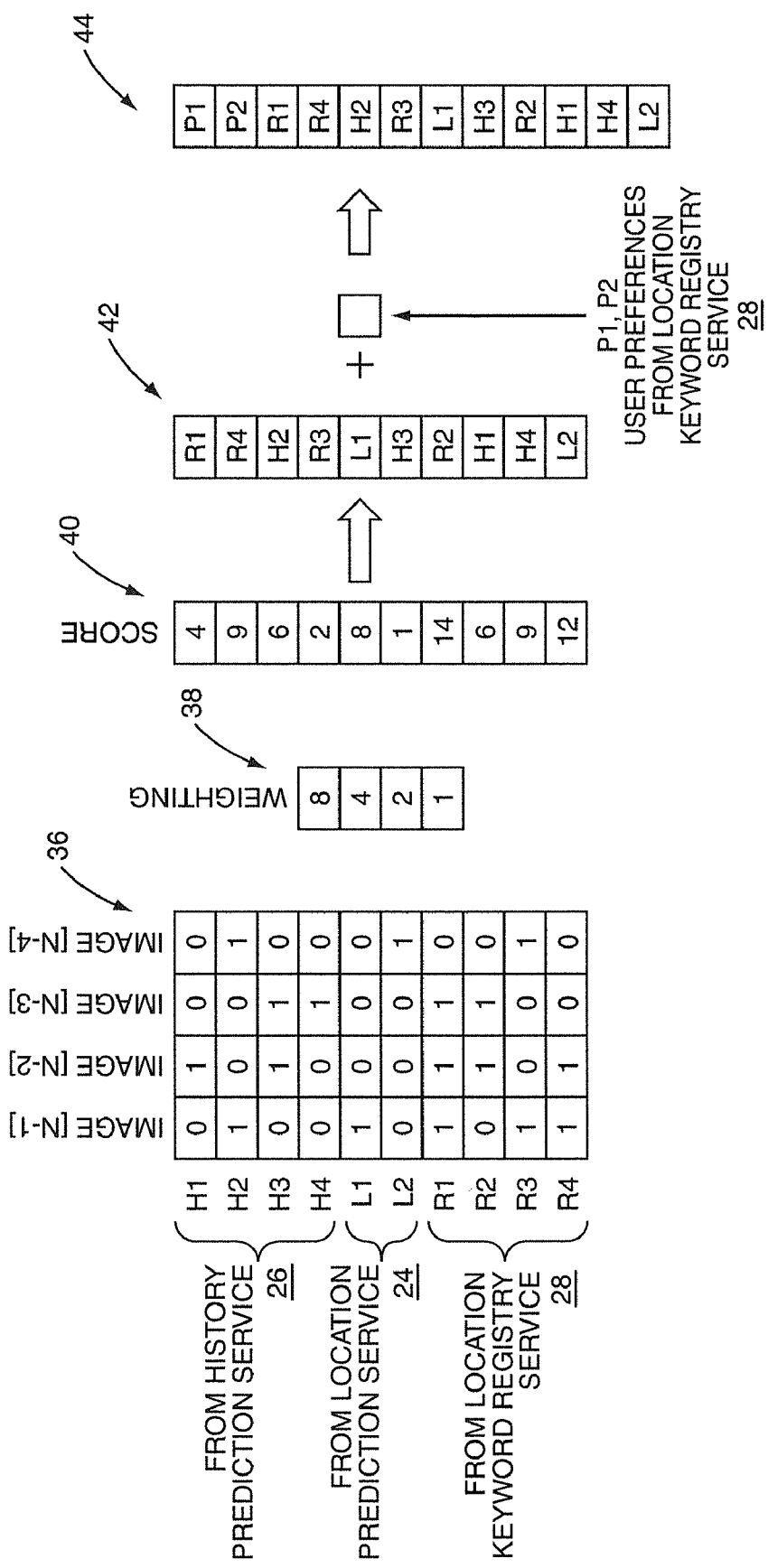
FIG. 3 illustrates an exemplary process for combining keywords from multiple keyword prediction services according to one embodiment of the present invention.

FIG. 3 illustrates an exemplary process for combining the keywords provided by the services 24-28 to generate the list of suggested keywords. In this example, the history prediction service 26 has provided keywords H1-H4, the location prediction service 24 has provided keywords L1 and L2, and the location keyword registry service 28 has provided keywords R1-R4. Note that in this example, the keywords R1-R4 do not include the user preferred keywords provided from the location keyword registry service 28.

The keyword service 22 begins the process of combining the keywords by examining the keywords used to tag a number of previous images, IMAGE[N−1]-IMAGE[N−4], captured by the user of the digital camera 12. Although this example uses four previous images, any number of previous images may be used. The previous images are examined to determine which of the keywords H1-H4, L1-L2, and R1-R4 were used to tag the previous images. This process is illustrated by table 36, where each row corresponds to one of the keywords H1-H4, L1-L2, and R1-R4 and each of the columns corresponds to one of the previous images IMAGE[N−1]-IMAGE[N−4]. A value of "0" indicates that a particular keyword was not used to tag the previous image, and a value of "1" indicates that a particular keyword was used to tag the previous image.

The previous images IMAGE[N−1]-IMAGE[N−4] may then be weighted by weighting table 38. The first value in the weighting table 38 is the weight assigned to the most recent image IMAGE[N−1], the second value in the weighting table 38 is the weight assigned to the next most recent image IMAGE[N−2], the third value in the weighting table 38 is the weight assigned to the image IMAGE[N−3], and the fourth value in the weighting table 38 is the weight assigned to the image IMAGE[N−4]. In this example, the most recent image is assigned a greater weight than less recent images. The table 36 and the weighting table 38 are combined to provide scores for each of the keywords H1-H4, L1-L2, and R1-R4. The scores for each of the keywords are stored in a score table 40.

The keywords H1-H4, L1-L2, and R1-R4 are then sorted based on the scores to provide a prioritized list of keywords 42. Thereafter, one or more preferred keywords P1-P2 previously defined by the user of the digital camera 12 from the location keyword registry service 28 are added to the prioritized list of keywords 42 to provide a list of keywords 44. In this example, the preferred keywords P1-P2 are assigned a highest priority. Note that in an alternative embodiment, the preferred keywords P1-P2 may be scored like the other keywords H1-H4, L1-L2, and R1-R4.

In one embodiment, the list of keywords 44 is the list of suggested keywords provided to the digital camera 12, and a number of the keywords from the list of keywords 44 having priority above a threshold are automatically selected when provided to the digital camera 12. For example, the two highest priority keywords may be automatically selected when the list of suggested keywords is displayed to the user at the digital camera 12. In another embodiment, only a number of the keywords from the list of keywords 44 are provided to the digital camera 12 as the list of suggested keywords. For example, the eight highest priority keywords from the list of keywords 44 may be provided to the digital camera 12 as the list of suggested keywords.

Figure 4A:
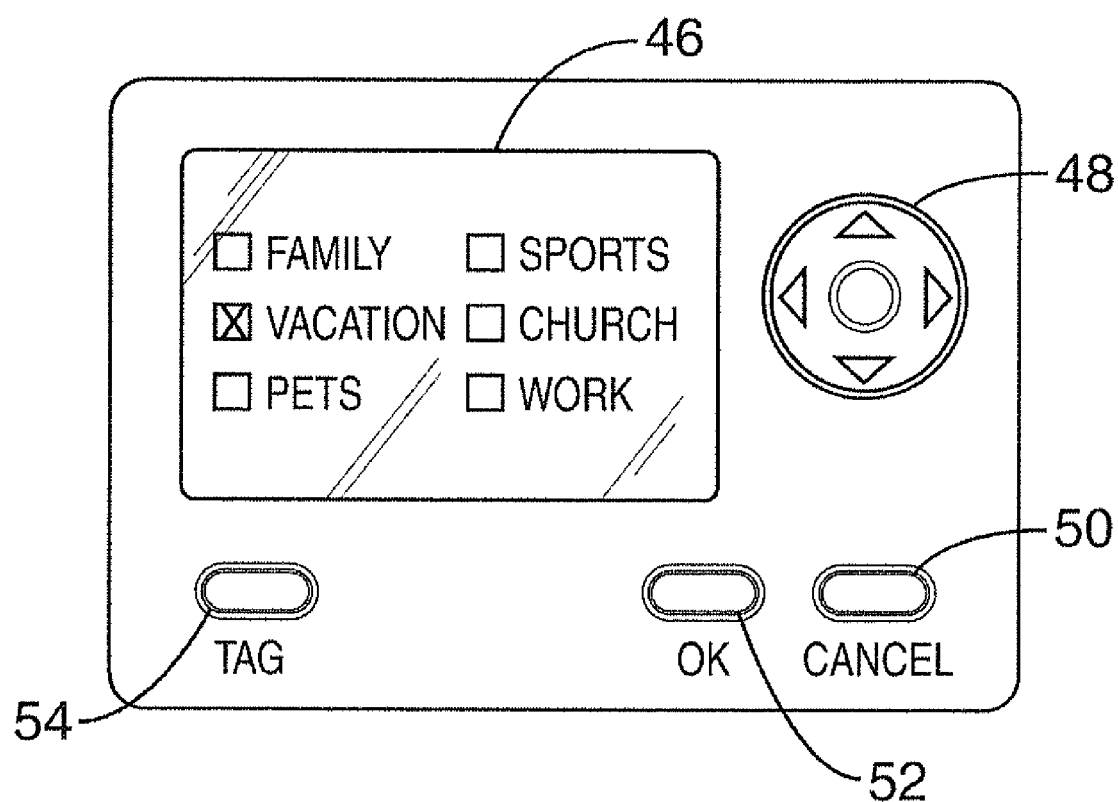
FIGS. 4A and 4B illustrate exemplary user interfaces for a digital camera for displaying suggested keywords to a user of the digital camera and enabling selection of one or more of the suggested keywords for tagging a digital image according to one embodiment of the present invention.
Figure 4B:
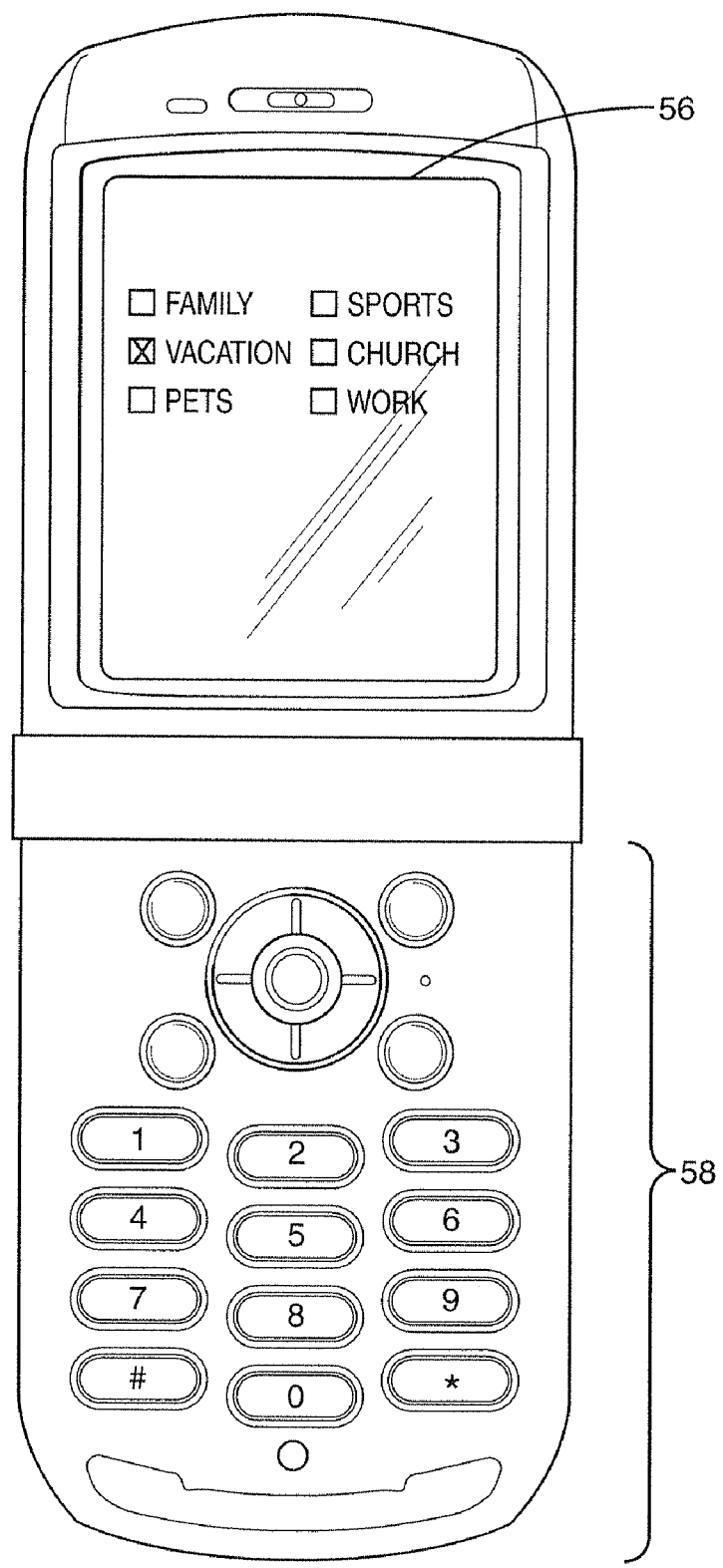

FIGS. 4A and 4B illustrate exemplary user interfaces for tagging a digital image with one or more of the suggested keywords at the digital camera 12. As shown in FIG. 4A, the list of keywords is displayed at the digital camera 12 using a user interface comprising a display 46 and a number of controls 48-54. The display 46 may be a Liquid Crystal Diode (LCD) display or the like. In operation, the list of suggested keywords is displayed on the display 46, and one or more of the suggested keywords, such as the keyword "vacation," may be automatically selected. The user of the digital camera 12 may then interact with the digital camera 12 using the controls 48-54 to select additional keywords from the list of suggested keywords, unselect automatically selected keywords, and tag the digital image with the selected keywords. FIG. 4B is similar to the user interface of FIG. 4A and includes a display 56 and controls 58. However, in FIG. 4B, the user interface is that of a camera phone.

Figure 5:
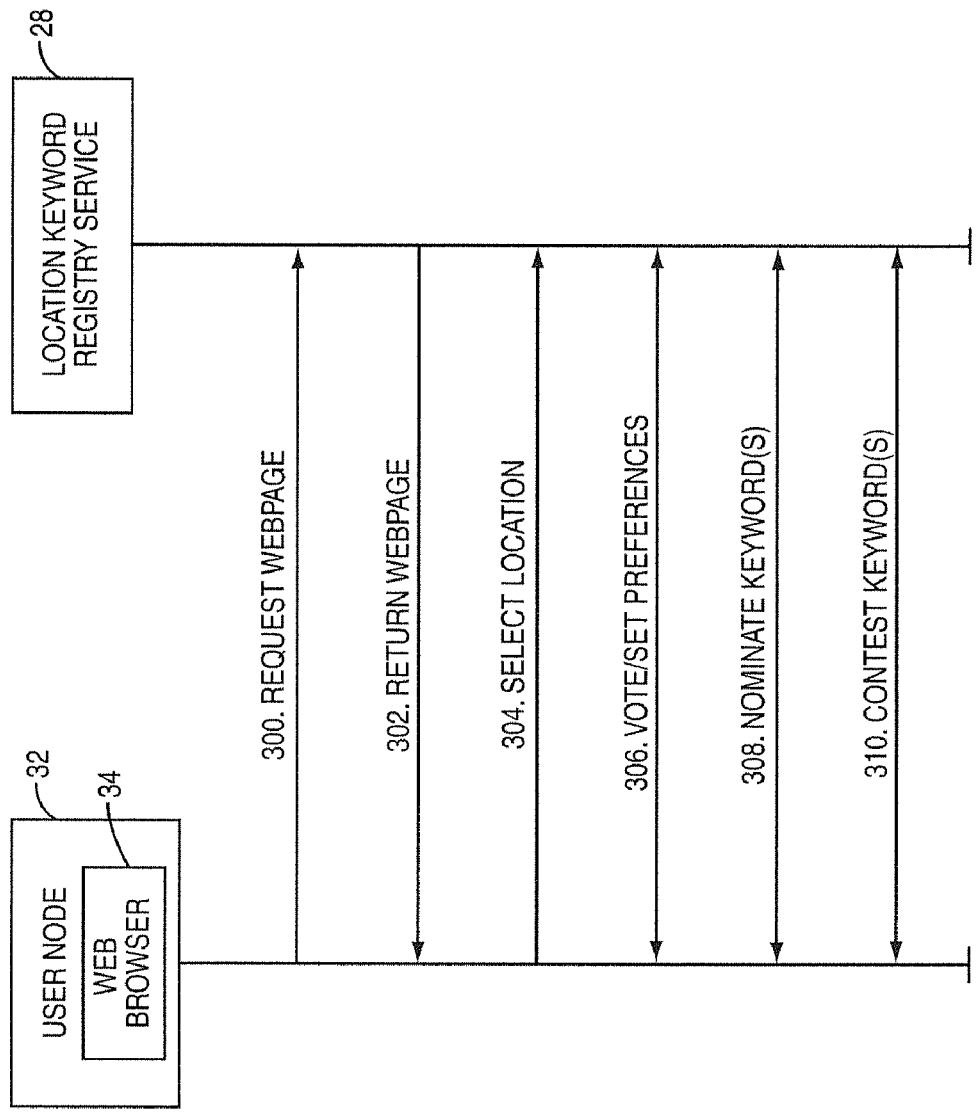
FIG. 5 illustrates one iteration of a collaborative process for maintaining the location keyword registry service of FIG. 1.

FIG. 5 illustrates a collaborative process for maintaining the location keyword registry service 28. The location keyword registry service 28 is preferably implemented on a server hosting a webpage or website operating as a user interface of the location keyword registry service 28. The server may also host a database associated with the webpage or website for storing information including keywords for numerous locations. In general, the location keyword registry service 28 is maintained through a collaborative process with any number of users such as a user at the user node 32, wherein the user may nominate or add keywords for particular locations, vote on keywords for particular locations, select user preferred keywords for particular locations, and contest keywords previously added for particular locations.

More specifically, the collaboration process begins when a user at the user node 32 requests a webpage corresponding to the user interface of the location keyword registry service 28 via the web browser 34 (step 300). In response, the server hosting the location keyword registry service 28 returns the webpage to the user node 32 (step 302). Thereafter, the user at the user node 32 may interact with the location keyword registry service 28 via the web browser 34 in order to select a location (step 304), vote for keywords for the location (step 306), nominate or add one or more keywords for the location (step 308), and/or contest one or more keywords previously nominated for the location (step 310). Voting for keywords for the location enables the location keyword registry service 28 to determine the popularity of each nominated keyword for location. By accumulating votes from each of a plurality of users, the popularity of the keywords for each location can be determined. The popularity of the keywords may also be determined based on feedback from the digital camera 12 regarding the ones of the suggested keywords actually selected by the user at the digital camera 12 to tag a digital image.

Voting for the keywords may also serve to select the preferred keywords for the location for the user at the user node 32. More specifically, the location keyword registry service 28 may store the keywords for which the user at the user node 32 has voted as preferred keywords for the location for the user. Thereafter, if the user captures a digital image at the location with a digital camera operating according to the present invention, the location keyword registry service 28 may provide the preferred keywords for the user, one or more of the most popular keywords for the location, and optionally one or more of the less popular keywords for the location selected at random.

Nominating or adding keywords for the location allows the user to add keywords for the location, which may thereafter be voted on by the users of the location keyword registry service 28 to define the popularity of the added keywords. Contesting a keyword may decrease the popularity of keywords the user feels are not particularly relevant to the location. Alternatively, contesting a keyword may notify an operator of the location keyword registry service 28 that the contested keyword should be reviewed. If the user contesting a keyword is also the user who added the keyword, the keyword may simply be removed from the list of keywords for the location.

Figure 6:
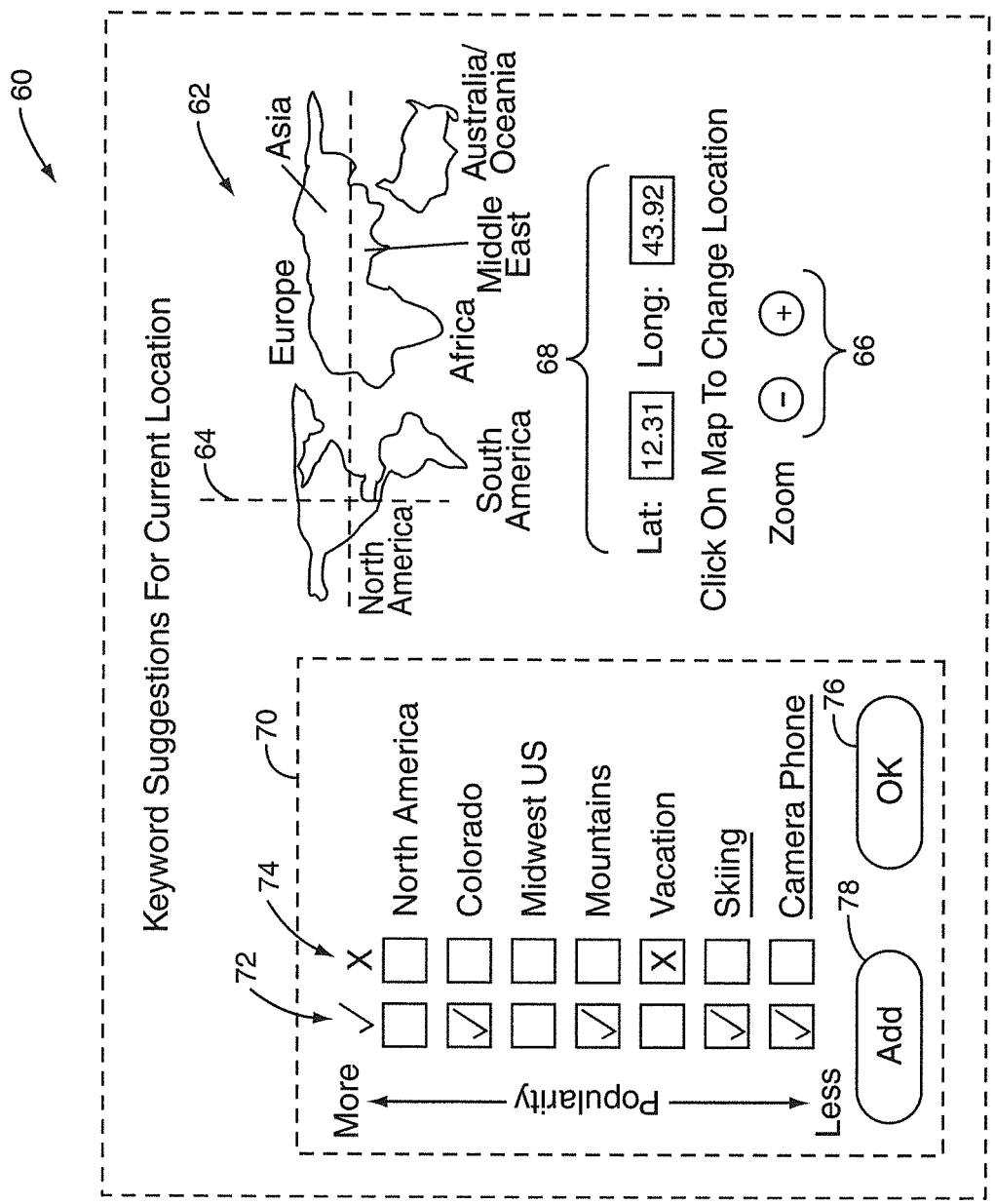
FIG. 6 illustrates an exemplary webpage serving as a user interface to the location keyword registry service of FIG. 1.

FIG. 6 illustrates an exemplary webpage 60 corresponding to the user interface of the location keyword registry service 28. Accessing the webpage 60 may require a log-in process where the user requesting to view the webpage 60 may be required to enter a username and optionally a password. The webpage 60 generally enables a user to select a location. In this example, a location may be selected using a map 62, cross-hairs 64, zoom control buttons 66, and optionally latitude and longitude fields 68. The user visiting the webpage 60 may select a location by using the cross-hairs 64 and the zoom control buttons 66 to select the desired location on the map 62. Alternatively, the user may select the desired location by entering a latitude and longitude corresponding to the desired location in the latitude and longitude fields 68.

Once the location is selected, a list of keywords 70 for the location is displayed on the webpage 60. As illustrated, the list of keywords 70 may include the most popular keywords at the top of the list of keywords 70 and the less popular keywords at the bottom of the list of keywords 70. The list of keywords 70 may also include a first column of checkboxes 72 and a second column of checkboxes 74.

The user visiting the webpage 60 may vote for keywords for the location by selecting the desired keywords using the first column of checkboxes 72 and then selecting an "OK" button 76. Voting for the keywords enables the location keyword registry service 28 to determine the popularity of keywords for the location. Voting for the keywords may also set the selected keywords as the preferred keywords for the user for the location.

The user visiting the webpage 60 may also contest keywords for the location by selecting the keywords he desires to contest from the list of keywords 70 using the second column of checkboxes 74 and then selecting the "OK" button 76. Contesting a keyword may be beneficial when the user feels that the selected keywords are not particularly relevant to the location and enable the location keyword selection service 28 to reduce the popularity of the contested keywords. Alternatively, an operator associated with the location keyword registry service 28 may be notified that the particular keyword has been contested. In response, the operator may review the contested keyword and determine whether the keyword should remain or be removed from the list of keywords 70 for the location. If the user visiting the webpage 60 is the one who added a particular contested keyword, the keyword may simply be deleted.

The user visiting the webpage 60 may nominate new keywords for the selected location by selecting an "add" button 78. In response, the web browser 34 at the user node 32 may be redirected to a second webpage where the user enters the keywords to add for the location. In this example, the keywords "Skiing" and "Camera Phone" were previously added by the user, as indicated by the underlining of the keywords. However, it is not necessary that the keywords added by the user be underlined.

Figure 7:
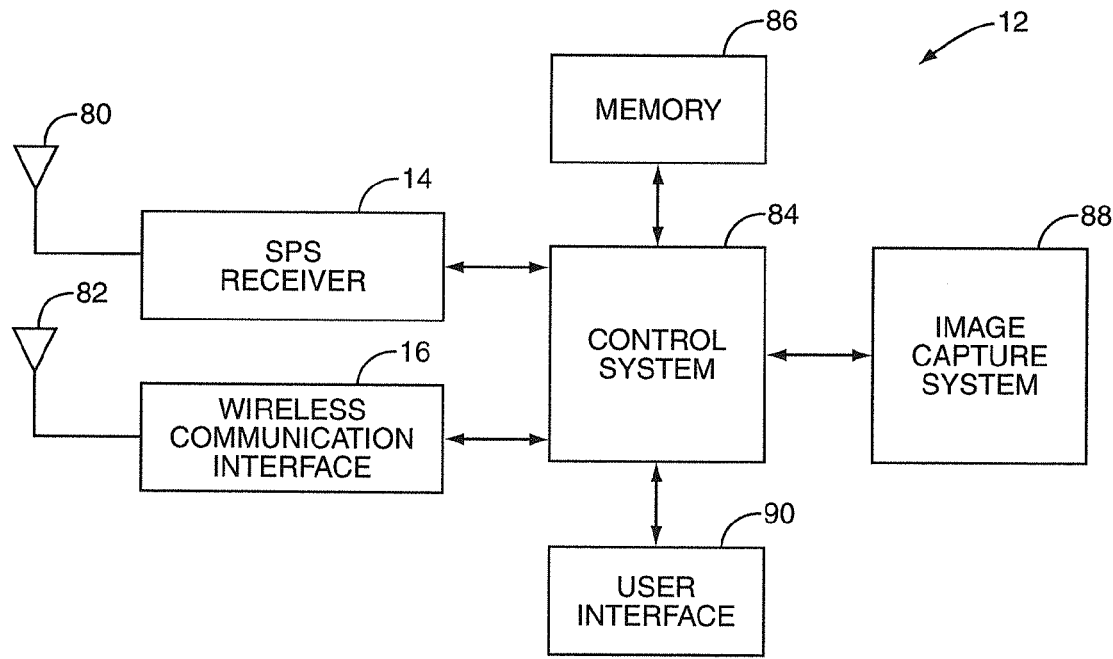
FIG. 7 is a block diagram of one embodiment of a digital camera operating according to one embodiment of the present invention.

FIG. 7 illustrates a block diagram of an exemplary embodiment of the digital camera 12. In general, the digital camera 12 includes the SPS receiver 14 and the wireless communication interface 16 coupled to antennas 80 and 82, respectively. The digital camera 12 also includes a control system 84, memory 86, an image capture system 88, and a user interface 90. The control system 84 may be a digital processor operating according to software, where the software instructs the control system 84 to operate, at least in part, according to the present invention. The memory 86 may be used to store digital images. The image capture system 88 includes various components other than the control system 84 which are needed to capture digital images. The user interface 90 includes a display and controls, as illustrated in FIGS. 4A and 4B. The user interface 90 may also include components such as a microphone and speaker.

Figure 8:
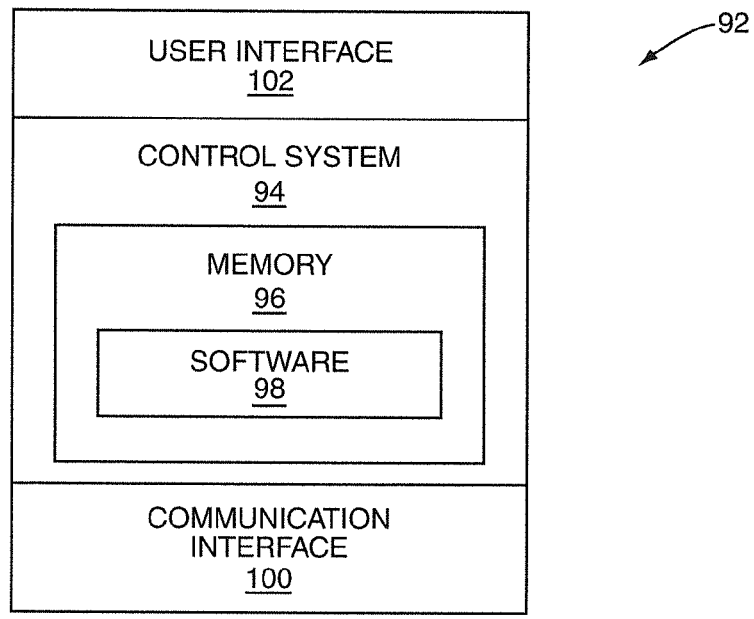
FIG. 8 is a block diagram of a server for hosting one or more of the services of FIG. 1.

FIG. 8 is a block diagram of an exemplary server 92. The server 92 may host one or more of the services 22-30 of FIG. 1. In general, the server 92 includes a control system 94 having associated memory 96. The memory 96 stores software 98, where the software 98 may include software corresponding to one or more of the services 22-30. The software 98 may also include additional software as needed or desired for operation of the server 92. The server 92 also includes a communication interface 100 for communicating with other network entities over the network 18 (FIG. 1), and a user interface 102. The user interface 102 may include a display, keyboard, mouse, and the like.

The present invention provides substantial opportunity for variation without departing from the spirit or scope of the present invention. For example, while the present invention is described above with respect to the digital camera 12 having the wireless communication interface 16, the present invention is equally applicable to images taken by a digital camera not having a wireless communication interface to the network 18. More specifically, the digital camera may include an SPS receiver 14 and operate to store positional information from the SPS receiver 14 in association with digital images at the time of capture. Thereafter, the digital images may be uploaded to the user's personal computer or the like being communicatively coupled to the network 18. The personal computer, rather than the digital camera, may then request suggested keywords from the keyword service 22 as described above.

As another example, the digital camera 12 may obtain the positional information by using a system other than the SPS receiver 14. For example, the digital camera 12 may obtain the positional information from a nearby mobile device equipped with an SPS receiver via a wireless communication interface such as a Bluetooth transceiver, Radio Frequency Identification (RFID) tag reader, a transceiver operating according to one of the IEEE 802.11 standards or the Wi-Fi standard, or the like. Alternatively, the digital camera 12 may obtain the positional information from a mobile base station in a cellular network.

As yet another example, a digital camera not including an SPS receiver or the like may be used together with the location keyword registry service 28 to obtain suggested keywords for digital images. More specifically, once the digital image is uploaded to the user's personal computer or the like or while the digital image resides on the digital camera, the location keyword registry service 28 is accessed via the network 18. Since the positional information is not known, the user may interact with the location registry service 28 to select a location in a manner similar to that described above with respect to FIG. 6. In response, the location keyword registry service 28 may provide suggested keywords to the requesting node, which may be the digital camera or the user's personal computer. The user may then select one or more of the suggested keywords for tagging the digital image.

Those skilled in the art will recognize improvements and modifications to the preferred embodiments of the present invention. All such improvements and modifications are considered within the scope of the concepts disclosed herein and the claims that follow.

What is claimed is:

1. A server for suggesting keywords for tagging digital media comprising:
    a) a communication interface coupling the server to a network; and
    b) a control system configured to:
        i) receive a request for suggested keywords for the digital media from a requesting node, the request including positional information defining a location associated with the digital media;
        ii) generate a list of suggested keywords, which are metadata, based on the positional information defining the location associated with the digital media such that the list of suggested keywords includes previous keywords used to describe other images captured proximate to the location associated with the digital media, wherein the control system is configured to generate the list of suggested keywords by being further configured to:
            A) search a plurality of digital media previously captured by a plurality of owners to find previously captured digital media captured at the location or proximate to the location defined by the positional information, and identifying a first plurality of keywords used to tag the previously captured digital media;
            B) provide the positional information to a location keyword registry service and receive a second plurality of keywords associated with the location defined by the positional information from the location keyword registry service, wherein the location keyword registry service provides the second plurality of keywords based on a collaborative process with a plurality of users defining at least one keyword for each of a plurality of locations; and
            iii) provide the list of suggested keywords to the requesting node via the network, wherein at least one of the list of suggested keywords is selected at the requesting node for storage in association with the digital media at the requesting node.

2. The server of claim 1 wherein the positional information defines a location of a digital camera at the time of capturing the digital media.

3. The server of claim 1, wherein the control system is configured to generate the list of suggested keywords by being further configured to:
    C) search a plurality of digital media previously captured by an owner of the digital media to find previously captured digital media captured at the location or proximate to the location defined by the positional information, and identifying a third plurality of keywords used to tag the previously captured digital media.

4. A method for suggesting keywords for tagging digital media comprising:
    receiving a request for suggested keywords for the digital media from a requesting node, the request including positional information defining a location associated with the digital media;
    generating a list of suggested keywords, which are metadata, based on the positional information defining the location associated with the digital media such that the list of suggested keywords includes previous keywords used to describe other images captured proximate to the location associated with the digital media, wherein the list is generated by performing the following operations:
        searching a plurality of digital media previously captured by a plurality of owners to find previously captured digital media captured at the location or proximate to the location defined by the positional information, and identifying a first plurality of keywords used to tag the previously captured digital media;
        providing the positional information to a location keyword registry service and receiving a second plurality of keywords associated with the location defined by the positional information from the location keyword registry service, wherein the location keyword registry service provides the second plurality of keywords based on a collaborative process with a plurality of users defining at least one keyword for each of a plurality of locations; and
    providing the list of suggested keywords to the requesting node via the network, wherein a user at the requesting node selects at least one of the list of suggested keywords to store in association with the digital media at the requesting node.

5. The method of claim 4 wherein the positional information defines a location of a digital camera at the time of capturing the digital media.

6. The method of claim 4, wherein the list is further generated by searching a plurality of digital media previously captured by an owner of the digital media to find previously captured digital media captured at the location or proximate to the location defined by the positional information, and identifying a third plurality of keywords used to tag the previously captured digital media.

7. A server for suggesting keywords for tagging digital media comprising:

a) a communication interface coupling the server to a network; and
b) a control system configured to:
  i) receive a request for suggested keywords for the digital media from a requesting node, the request including positional information defining a location associated with the digital media;
  ii) generate a list of suggested keywords, which are metadata, based on the positional information defining the location associated with the digital media such that the list of suggested keywords includes previous keywords used to describe other images captured proximate to the location associated with the digital media, wherein the control system is configured to generate the list of suggested keywords by being further configured to perform the following:
    A) search a plurality of digital media previously captured by a plurality of owners to find previously captured digital media captured at the location or proximate to the location defined by the positional information, and identifying a first plurality of keywords used to tag the previously captured digital media; and
    B) search a plurality of digital media previously captured by an owner of the digital media to find previously captured digital media captured at the location or proximate to the location defined by the positional information, and identifying a third plurality of keywords used to tag the previously captured digital media; and
  iii) provide the list of suggested keywords to the requesting node via the network, wherein a user at the requesting node selects at least one of the list of suggested keywords to store in association with the digital media at the requesting node.

8. The server of claim 7 wherein the positional information defines a location of a digital camera at the time of capturing the digital media.

* * * * *